Nov. 3, 1931.  R. LINDE  1,830,610

PROCESS OF PRODUCING MIXTURES OF HYDROGEN AND NITROGEN

Filed Feb. 9, 1926  2 Sheets-Sheet 2

Patented Nov. 3, 1931

1,830,610

UNITED STATES PATENT OFFICE

RICHARD LINDE, OF MUNICH, GERMANY

PROCESS OF PRODUCING MIXTURES OF HYDROGEN AND NITROGEN

Application filed February 9, 1926, Serial No. 87,140, and in Germany February 25, 1925.

This invention relates to the separation of hydrogen from gases containing the same, as water gas or coke oven gas, by the well-known method of partial liquefaction under pressure at low temperature and has particular reference to the production of a mixture of hydrogen and nitrogen practically free from carbon monoxide and other impurities.

The said processes require a cooling of the gas to be decomposed to a temperature low enough to liquefy all carbon monoxide and other constituents to be eliminated if a pure gas suitable for instance for the synthesis of ammonia, is to be produced. It has been suggested either to use liquid nitrogen as a cooling agent, boiling under very low pressure and produced in a separate liquefying plant, or to cool the gas by expansion of the produced hydrogen in an expansion motor, in both cases final temperatures of $-200°$ Celsius or less being attained. The aim of my invention is to avoid the inconveniences caused by these very low temperatures, i. e. the losses of cold caused by condensation of atmospheric air at the parts colder than its liquefying temperature and the lessening of heat absorption by decreasing temperature.

Figure 1:
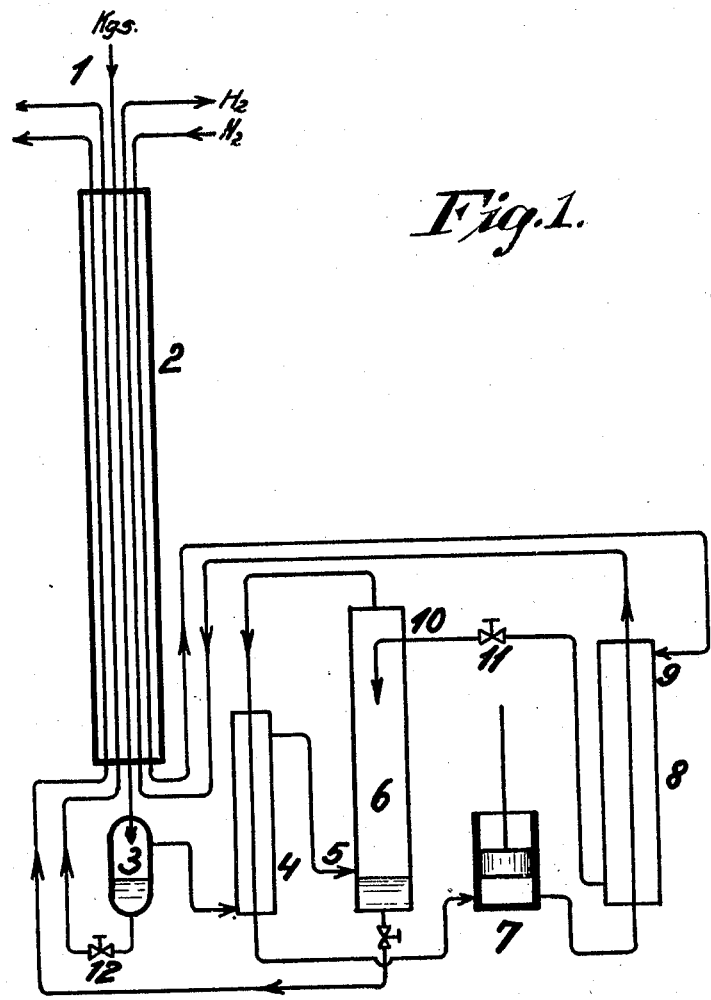
Figure 2:
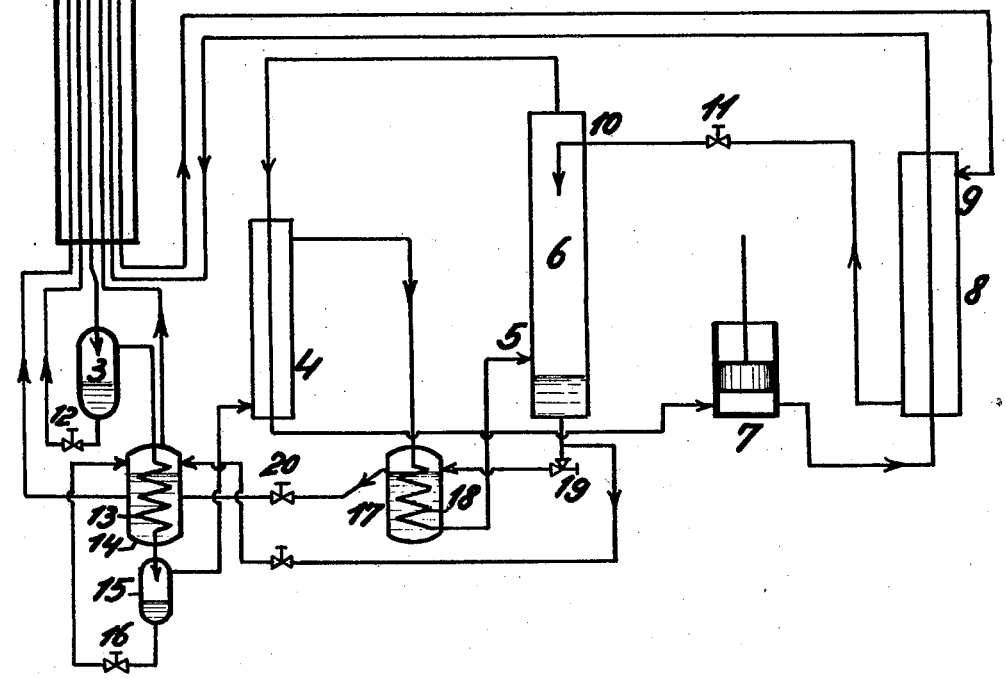

My invention may be described with reference to the accompanying drawings of which Fig. 1 is a diagrammatic illustration of one embodiment of the present invention; and Fig. 2 is a diagrammatic illustration of a different embodiment. The drawings do not contain such parts as compressors, water-cooler, gas purifier, nitrogen producer etc. which are supposed to be generally known as well as the usual means for heat interchanging, washing gases with liquids, absorbing heat by expansion etc.

The gas to be decomposed, for instance coke oven gas, being previously compressed to a pressure between 5 and 50 atmospheres cooled with water and purified from $CO_2$, $H_2O$, sulphur components etc. enters into a heat interchanger 2 at 1 and is cooled herein by the cold products flowing in opposite direction.

Methane and less volatile components liquefied by cooling, are separated in the separator 3, expanded by a valve 12 and passed on through 2. The remaining gas is further cooled in the interchanger 4, further portions of $CH_4$, CO etc. being condensed and separated from the gas in a separator or in the lower part of column 6. The gas entering at 5 will contain (besides $N_2$) considerable portions of $CH_4$ and CO. The contents of these impurities may attain or even exceed the percentage of nitrogen in the finally produced gas, though the latter must be practically free from impurities as CO and $CH_4$.

The elimination of these impurities is performed not by condensation but by washing the gas in a column 6 with liquid nitrogen. The quantity of liquid nitrogen must be rather considerable for two reasons; the first is that a nearly perfect elimination of CO requires a large portion of washing liquid, the second is that nearly all losses are to be compensated by means of the liquid nitrogen introduced into the column 6; the heat of liquefaction of the nitrogen must therefore be nearly equal to the effective absorption of heat by the expansion motor 7, to be described at once, the quantity of nitrogen thus being fixed.

The gas leaving the column 6 is utilized for absorption of heat by expansion to nearly atmospheric pressure in a motor 7 mentioned before. In order to secure a final temperature of expansion higher than the boiling point of nitrogen under atmospheric pressure, the gas is not led directly to the motor but is reheated in the interchanger 4 by warmer gas before washing. The regulation of the temperatures can be performed by altering the initial pressure according to the composition of the gas; another way is to pass the gas between the interchanger 4 and the column 6 in a cooling spiral through a bath of the liquid collected under the column (or liquid nitrogen) expanded to such a pressure that the boiling liquid cools the mixture to the desired temperature (as shown in Fig 2.).

The gas leaving the expansion motor with low temperature passes through the interchanger 8 liquefying therein nitrogen which, entering at 9 after being precooled in the interchanger 2, flows in opposite direction to the gas and passes to the column 6 through the valve 11.

The hydrogen mixture having passed the interchanger 8 is conducted through the interchanger 2 as well as the other products of separation which all leave the apparatus with nearly ordinary temperature.

The transferring of heat to the motor 7 from the nitrogen can of course be performed also in an indirect way, for instance by conducting the cold expanded gas through the interchanger 4 and the cold gas from the column 6 through 8.

The refrigeration of the original gas may be performed in several stages with separate collection of the condensed liquids, and separate vaporization of the same by means of the original gas passing in pipes through them (see Fig. 2).

The contents of hydrogen may be regulated in addition to the means described before by cooling the mixture leaving the column 6 by means of a bath of liquid nitrogen or of the liquid from the lower end of column 6 boiling under a pressure low enough to condense the desired quantity of nitrogen from the mixture.

I claim:

1. A process of producing substantially pure mixtures of hydrogen and nitrogen from gases containing hydrogen and components less volatile than nitrogen by partial condensation under pressure, which comprises cooling the compressed original gas by counter-current heat exchange with the final products, liquefying sufficient of the components less volatile than nitrogen that the hydrogen content of the remaining gas is not less than that desired in the final mixture, washing the remaining gas with liquid nitrogen under pressure, expanding the washed gas in an expansion motor with absorption of heat, after previously heating it to such a temperature that the final temperature of expansion is higher than $-192°$ C., utilizing the cold of expansion for the liquefaction of the nitrogen used in the process, the quantity of said nitrogen being sufficient to reheat the expanded gases to nearly the initial temperature of expansion and thereafter utilizing the expanded gas for the partial liquefaction of the original gas mixture.

2. A process of producing substantially pure mixtures of hydrogen and nitrogen from gases containing hydrogen and components less volatile than nitrogen by partial condensation under pressure, which comprises cooling the compressed original gas by counter-current heat exchange with the final products, liquefying sufficient of the components less volatile than nitrogen that the hydrogen content of the remaining gas is not less than that desired in the final mixture, washing the remaining gas with liquid nitrogen under pressure, expanding the washed gas in an expansion motor with absorption of heat, after previously heating it to such a temperature that the final temperature of expansion is higher than $-192°$ C., utilizing the cold of expansion for the liquefaction of the nitrogen used in the process, the quantity of said nitrogen being sufficient to reheat the expanded gases to nearly the initial temperature of expansion, and said utilization being effected by indirect contact of the expanded washed gases with the nitrogen to be liquefied and thereafter utilizing the expanded gas for the partial liquefaction of the original gas mixture.

In testimony whereof I have signed my name to this specification.

RICHARD LINDE.

CERTIFICATE OF CORRECTION.

Patent No. 1,830,610.                            Granted November 3, 1931, to

RICHARD LINDE.

It is hereby certified that error appears in the printed specification of the above numbered patent requiring correction as follows: Page 2, lines 36 and 60, claims 1 and 2, respectively, strike out the word "sufficient" and insert instead only such an amount; same page and claims, lines 38 and 62-63, strike out the words "not less than" and insert about, and lines 41 and 65, after "pressure" insert and at a temperature higher than 192° C.; and that the said Letters Patent should be read with these corrections therein that the same may conform to the record of the case in the Patent Office.

Signed and sealed this 9th day of February, A. D. 1932.

(Seal)                                                               M. J. Moore,
                                                                      Acting Commissioner of Patents.